United States Patent [19]

Fell

[11] Patent Number: 5,543,199
[45] Date of Patent: Aug. 6, 1996

[54] CONTINUOUS PROCESS FOR THE PREPARATION OF UNITARY THERMOPLASTIC HONEYCOMB CONTAINING AREAS WITH DIFFERENT PHYSICAL PROPERTIES

[75] Inventor: Barry M. Fell, Hummelstown, Pa.

[73] Assignee: Hexcell Corporation, Pleasanton, Calif.

[21] Appl. No.: 22,569

[22] Filed: Feb. 25, 1993

Related U.S. Application Data

[62] Division of Ser. No. 620,958, Dec. 3, 1990, Pat. No. 5,217,556.

[51] Int. Cl.$^6$ .................................................. B32B 3/12
[52] U.S. Cl. .................................... 428/116; 428/118
[58] Field of Search ........................... 156/197; 428/116, 428/118; 52/806, 793.1; 493/966

[56] References Cited

U.S. PATENT DOCUMENTS

| | | | |
|---|---|---|---|
| 2,821,616 | 1/1958 | Spott | 428/116 X |
| 2,919,472 | 1/1960 | Steele | 156/197 X |
| 3,134,705 | 5/1964 | Moeller | 156/197 |
| 3,356,555 | 12/1967 | Jackson | 428/116 X |
| 3,673,058 | 6/1972 | Jackson et al. | 428/118 |
| 4,209,162 | 6/1980 | Petiau | 428/116 X |
| 4,385,092 | 5/1983 | Singer, Jr. | 428/118 X |
| 4,957,577 | 9/1990 | Huebner | 428/116 X |
| 5,030,305 | 7/1991 | Fell | 156/197 |
| 5,128,192 | 7/1992 | Narasaki | 428/118 |
| 5,131,970 | 7/1992 | Potter et al. | 428/118 X |
| 5,137,768 | 8/1992 | Lin | 428/116 |
| 5,139,596 | 8/1992 | Fell | 428/116 X |
| 5,180,619 | 1/1993 | Landl et al. | 428/116 |
| 5,217,556 | 6/1993 | Fell | 428/116 X |

FOREIGN PATENT DOCUMENTS

| | | | |
|---|---|---|---|
| 312801 | 6/1929 | United Kingdom | 428/118 |
| 803259 | 10/1958 | United Kingdom | 428/118 |
| 87/06186 | 10/1987 | WIPO | 428/116 |

*Primary Examiner*—Henry F. Epstein
*Attorney, Agent, or Firm*—Sherman and Shalloway

[57] ABSTRACT

Honeycomb materials having areas or volumes possessing different physical properties then the remainder of the honeycomb are prepared in a continuous process without requiring machining operations.

9 Claims, 12 Drawing Sheets

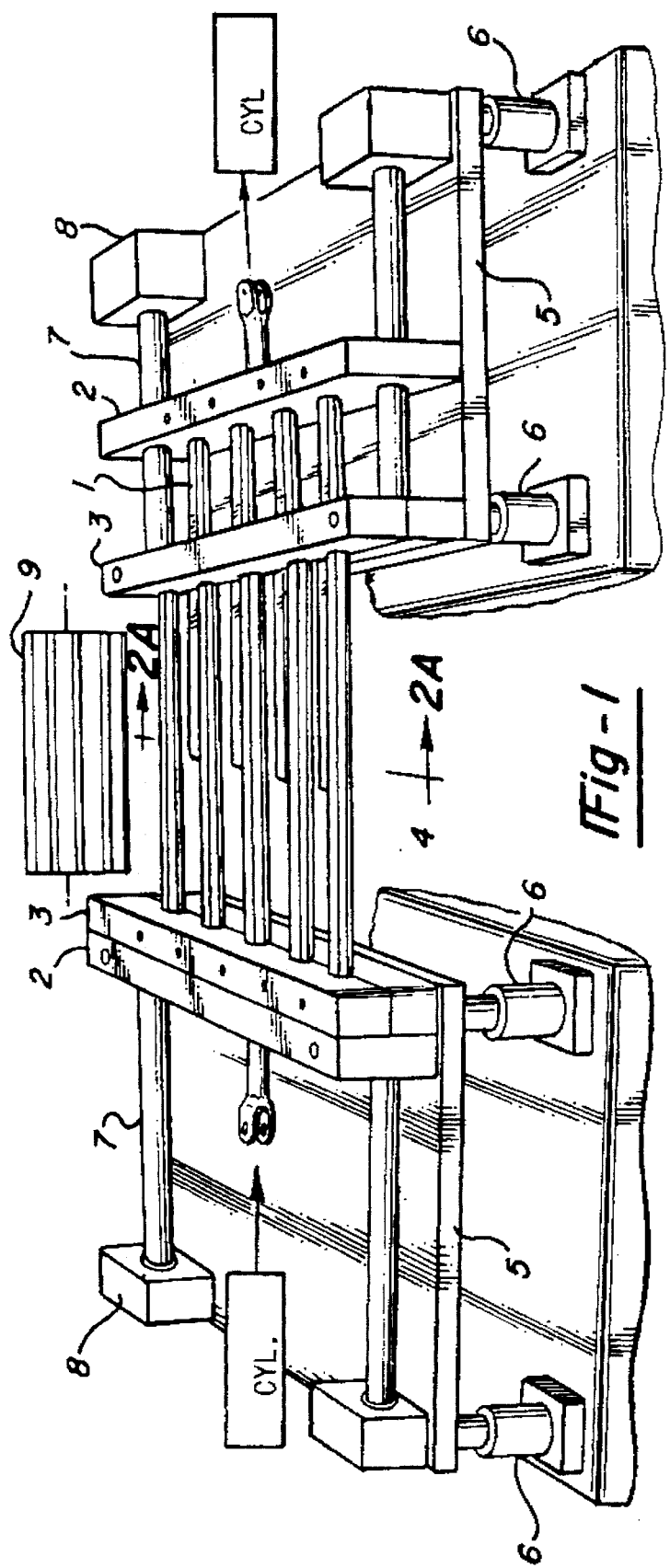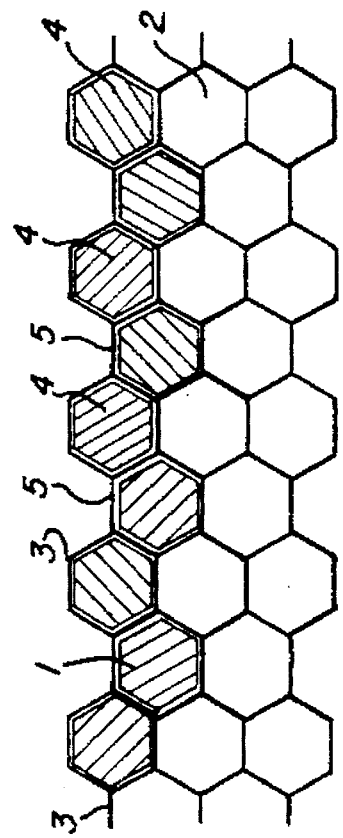

CONTINUOUS PROCESS FOR THE PREPARATION OF UNITARY THERMOPLASTIC HONEYCOMB CONTAINING AREAS WITH DIFFERENT PHYSICAL PROPERTIES

This application is a division of application Ser. No. 07/620,958, filed Dec. 3, 1990, now U.S. Pat. No. 5,217,556.

BACKGROUND OF THE INVENTION

1. Field of the Invention

The subject invention pertains to the field of thermoplastic honeycomb structural materials. More particularly, the invention pertains to honeycomb fabricated from fiber-reinforced and non-reinforced thermoplastic webs wherein the density and other physical characteristics of portions of the honeycomb are varied during the manufacture of the honeycomb. The invention further pertains to a process for manufacturing such honeycomb materials.

2. Description of the Related Art

Both fiber-reinforced and non-reinforced thermoplastic honeycomb materials have become important structural materials in the transportation and aerospace industries. In addition to their excellent strength to weight ratio, such materials also have electromagnetic properties which allow their permeability and reflectivity to electromagnetic radiation, particularly in the microwave, or radar range, to be varied across a broad spectrum.

However, frequently the load bearing capability of such honeycomb materials must be adjusted within the honeycomb itself. In the past, this has required carefully machining a cavity in the honeycomb and filling the cavity with a honeycomb insert having different structural properties, i.e. greater wall thickness, fiber content, or a different fiber reinforcement. In these machining operations, the honeycomb core must generally be filled with a cell support substance such as polyethyleneglycol wax following which, the honeycomb is cut, in the case of simple shapes, by a sharp knife or saw; or in the case of complex shapes, by computer controlled three dimensional cutting machines as are commonly found in the tooling and machining industries. Following the machining operation, the polyethylene glycol wax is melted and the part repeatedly washed to remove all traces of wax.

These two male/female parts must then be carefully and laboriously bonded together adhesively. The time and cost of such operations together with the possibility of incomplete bonding has limited the use of such structures.

U.S. Pat. No. 3,356,555 to Jackson discloses a batch method of preparing honeycomb core wherein a squirrel cage roller containing hexagonal bars operates in conjunction with a plurality of hexagonal major bars on a fixed bed to provide a corrugated web by the action of compressing a heated thermoplastic web between the advancing squirrel cage bars and the fixed bed bars. The corrugated webs thus produced are then assembled into a honeycomb structure by placing a first corrugated web on the major bars of a bed followed by placing minor bars in the nodes above the web. A second corrugated sheet is then located with its nodes adjacent to the first web's antinodes. An additional layer of minor bars is placed on top and the procedure repeated until the desired honeycomb thickness is achieved. The assembly is then placed between caul plates and platens and heated to form a finished honeycomb product.

In GB-A-2 188 866, a batchwise method of preparing thermoplastic honeycomb is disclosed wherein shaped formers as disclosed by Jackson in U.S. Pat. No. 3,356,555 are disposed between adjacent corrugated thermoplastic sheets, the assembly pressurized, and heated to cause the thermoplastic to fuse. Following the preparation of one multiple cell honeycomb segment by such batchwise operation, the section may be advanced to allow a further section to be laid up and fused. The process described requires pressurizing and heating the entire newly formed honeycomb structure.

The related art processes produce honeycomb cores in batchwise fashion requiring lengthy heating and cooling cycles to process the honeycomb, or by expansion methods which are directed to but limited honeycomb sizes and the honeycombs not having optimal properties. The processes of Jackson '555 and Great Britain '866 require the use of numerous layers of expensive metal formers. For example, a four foot length of 0.125 cell width honeycomb having but a height of four cells would require in excess of 1400 metal formers. Furthermore, such batchwise processes are time consuming, and require pressurizing an entire honeycomb structure to enable thermoplastic fusion and adherence.

Furthermore, because the abutting node and antinode surfaces of web material is double the thickness of the non-abutting surface, this thickness disparity creates a displacement error in assembling honeycombs using metal formers. Because the error is magnified by each successive cell layer, it is virtually impossible to keep such cores aligned during layup and during cure under pressure. If the formers are made unsymmetrical, i.e. a flattened hexagon, then layup is facilitated, but distortion still occurs during consolidation as the double thickness abutting layers are compressed during fusion to approximately 80 percent of their initial thickness.

In the parlance of one skilled in the art of honeycomb production and usage, the thickness of the honeycomb is considered as the dimension parallel to the corrugations, the length is the direction along the same surface as the corrugations but at a right angle thereto, and the width is the direction across the cells perpendicular to the plane of the corrugations (thickness and length directions).

OBJECTS OF THE INVENTION

It has now been discovered that honeycomb materials having varying density and/or physical and/or electromagnetic properties may be produced during initial construction of the honeycomb in a rapid and cost-effective manner. Thus the necessity for machining and adhesive bonding may be eliminated.

BRIEF DESCRIPTION OF THE DRAWINGS

FIG. 1—A drawing of the honeycomb forming bed with primary formers inserted and secondary formers partially inserted.

FIGS. 2A–2C—Side views of the bed showing the ends of the primary and secondary formers with top most and penultimate layers of fiber reinforced corrugated layers in node to antinode contact and production of honeycomb one half cell layer at a time.

Figure 2B:
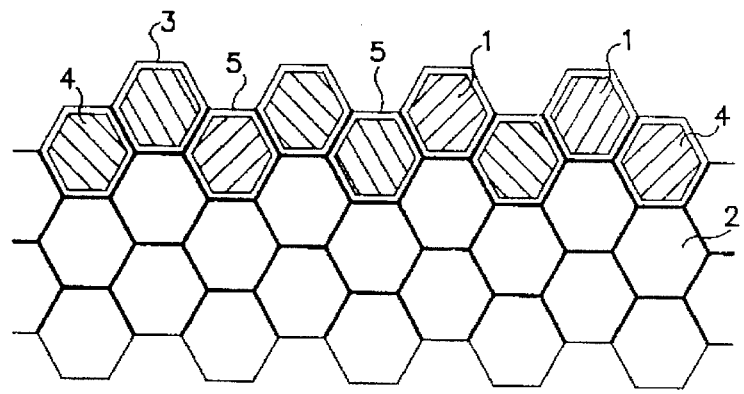

The variable density honeycomb cores of the subject invention are prepared by a continuous or semi-continuous process as hereinafter described in greater detail. In this process, a precorrugated or non-corrugated web of fiber-reinforced or non-reinforced thermoplastic is layed up and consolidated into a honeycomb layer by layer, each layer representing a half cell height of the finished honeycomb.

In the process hereinafter described, thermoplastic webs had previously been used in but one constant thickness per layer. It was unexpectedly discovered, however, that a second or even third or forth layer of the same or different material could be consolidated contiguously with the prior layer, resulting in a half-cell layer of greater density, and that moreover, these subsequent layers do not have to be of the same dimensions as the first layer, but may be smaller and irregularly shaped, producing areas of locally increased density which may be tailored to the application. Surprisingly, the bonding of subsequent webs to each layer could be accomplished easily, with thorough bonding, and without significantly distorting the honeycomb itself, although distortion could be expected in extreme cases, especially when the honeycomb produced is asymmetrical.

In addition to varying the density, and thus structural characteristics of the honeycomb, this method may also be used to vary the electromagnetic properties. For example, a second web having different electromagnetic properties, i.e. greater permeability, absorbtivity, or reflectivity for particular regions of the electromagnetic spectrum may be applied.

In addition to continuous webs of different electromagnetic character, webs having randomly or geometrically spaced holes may be applied. Such honeycomb may have uses in so-called "stealth" applications.

As used herein, the term "thermoplastic web" is not limited to but is inclusive of sheets of fiber-reinforced thermoplastic, spun-bonded thermoplastics, and non-reinforced thermoplastics. Such thermoplastics may further contain various fillers such as particles or whiskers of metal, metal oxides, metal coated flakes, particles, or fibers, and the like. The term "thermoplastic web" is also inclusive of thermosetting materials which demonstrate thermoplastic behavior prior to final cure and are thus susceptible of fusion bonding; and to thermoplastics also containing minor quantities, i.e. up to about 50 weight percent based on the total polymer content, of traditional thermosetting resins, i.e. epoxy resins, bismaleimide resins, cyanate resins, isocyanate resins, and the like.

The process of the subject invention may be achieved by first laying down an initial layer of thermoplastic web, preferably in the manner described in Example 4 utilizing machinery as illustrated by FIGS. 1, 4, 8, 6 and 12. The second and subsequent layers may be precorrugated and tacked into position with a hot iron or clamped by suitable clamping means, following which this layer is consolidated onto the previous layer, or, in the case where a continuous web may be utilized as illustrated in FIGS. 13A and B may be supplied by a second or third corrugation/consolidation roller.

By the term "unitary honeycomb structure" is meant a honeycomb which is prepared as an integral unit as opposed to a honeycomb prepared form two different honeycombs and adhesively bonded or fusion bonded together. By the term "primary thermoplastic web" is meant the initial thermoplastic web laid down as described herein the nodes of which web are fusion bonded to the antinodes of the previously formed topmost honeycomb layer. By the term "secondary thermoplastic web" is meant a second or subsequent layer of thermoplastic web which is bonded atop the primary thermoplastic web; whose nodes and antinodes correspond with the nodes and antinodes of the primary web; and whose length and thickness dimensions are the same or different from those of the primary web. When more than one secondary web is utilized, the dimensions of one secondary web relative to other secondary webs may or may not be the same. The primary web is the web first laid down regardless of its dimensions.

By the term "different physical properties" as applied to honeycomb core in the claims is meant a portion, or volume of the honeycomb which possesses different mechanical properties, i.e. tensile strength, compressive strength, density, modulus, etc; or different electromagnetic, electrical resistivity, dielectric constant, loss factor, reflectivity, absorbtivity, or dispersivity to electromagnetic radiation properties. By the term "different characteristics" as applied to thermoplastic web, is meant a thermoplastic web being different from at least a portion of other thermoplastic web material utilized in preparation of the honeycomb in one or more, but not limited to, of the following respects: fiber type and/or content, fiber weave and/or orientation; number of plies in the web; presence or absence of fillers or other components such as coated or uncoated particles, flakes, whiskers, short fibers, microballoons, etc. of metal, metal oxides, ceramic, natural or synthetic polymers, and/or inorganic materials.

By "area" of the honeycomb having different physical characteristics is meant at least one half cell height or other area as measured in at least the length and thickness directions of the honeycomb (i.e. in directions in a plane perpendicular to the open cell face of the core) or any identifiable volume within the honeycomb where physical properties are different than at least one other area or volume of the core. By "areal dimensions" are meant dimensions measured in the same plane as that long one half cell height as above.

By the terms "node to antinode relationship" or "node to antinode bonding" is meant the positioning and or bonding of the crests or peaks of the topmost layer of existing honeycomb to the troughs or valleys of the next to be added half cell height honeycomb layer such that one full row of honeycomb cells are formed as a result. By "node to node" or "antinode to antinode relationship and/or fusion or bonding" is meant a positioning, followed by bonding, of at least one additional web of corrugated web atop the next previously laid and bonded web such that the crests and troughs of the most recently added layers correspond with the crests and troughs of the next previously laid layer, thus increasing the thickness and other physical characteristics of this layer without forming a new half layer of honeycomb or full row of honeycomb cells.

When such additional layers (secondary webs) are added, they must be bonded along at least some surfaces to the previously layered (primary) webs. Preferably, this bonding takes place by fusion along the nodes (troughs) of the secondary and primary webs. However, it is possible to bond the antinodes (crests), the sidewalls, or all of these.

The preparation of unitary honeycomb containing areas with different physical properties is accomplished by a continuous process whereby (a) a first set of metal formers of suitable shape are disposed such that one former is located within each cell of the topmost layer of a honeycomb structure of at least one cell thickness, (b) a second set of metal formers displaced laterally from the first set by half the cell spatial frequency are disposed in the antinode depressions located at the top surface of the honeycomb, (c) a corrugated web of thermoplastic is laid atop of the topmost set of metal formers such that the bottom surface of the antinodes of the corrugated web abut the top surface of the nodes of the honeycomb, (d) the node-antinode surfaces, or demes, are fused by selective heating means of these surfaces, (e) the lowermost set of formers is withdrawn from the core, raised by an amount sufficient to clear the thickness of the used node-to-antinode surface of the newly formed honeycomb cells, and disposed in the nodal depressions along the top surface of the honeycomb, becoming by virtue of this displacement the topmost set of formers; (f) a further corrugated web of thermoplastic is laid atop the topmost metal formers such that the bottom surface of the antinodes of the corrugated web abut the top surface of the nodes of the honeycomb, (g) the abutting node-antinode surfaces are fused by selective heating of these surfaces, and (h) steps (e)–(g) are repeated until the desired honeycomb width, which may be essentially infinite, is obtained. During this process, step c is repeated with an additional layer (secondary web) which may be the same or different than that first laid down (primary web) in size or composition, following which the nodes and/or antinodes of the secondary web(s) are bonded to the nodes and/or antinodes respectively of the primary web.

By means of the subject invention, honeycombs of virtually any dimensions may be obtained in a continuous, cost-effective manner, without the drawbacks associated with batchwise operations, e.g., the use of multitudinous bars or formers and the time-consuming batch fusing step which must be accomplished by pressurizing the entire honeycomb core assembly or portion thereof.

The thermoplastic matrix sheets useful in preparing corrugated sheets and ultimately the final honeycomb product contain a thermoplastic, preferably an engineering thermoplastic, and fibrous reinforcement.

Among the thermoplastics useful are the various polyesters, for example polyethylene terephthalate and polybutylene terephthalate, the aliphatic polyamides, for example nylon 6, nylon 66, nylon 4, nylon 12, and nylon 612 among others; the all aromatic polyamides or aramids, for example those produced under the trade name Kevlar®; mixed aliphatic/aromatic polyamides; polyalkylene polymers, for example polypropylene and polyethylene; the polyoxyalkylenes, for example polyoxymethylene polymers; the polyphenylene oxides; the polyphenylene sulfides; the various polyarylene polymers having interspersed between the arylene groups connecting groups such as —O—;

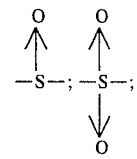

where R is a $C_1$–$C_{10}$ alkyl or aryl group or hydrogen;

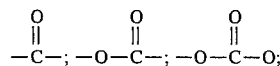

and the like, particular polysulfones, polyethersulfones, polyetherketones, polyetheretherketones, polyetherketoneketones and other variants; and thermoplastic polyimides, including those polyimdies which are thermoplastic initially but cure to form crosslinked structures at higher temperatures.

This foregoing list of thermoplastics is meant to be illustrative, and not limiting. Also useful, in this respect, are mixtures of thermoplastics, as well as mixtures of thermoplastics with a minor quantity, i.e., not more than about 20–30 weight percent of one or more thermosetting monomers, for example bismaleimides, epoxy resins, and cyanate ester resins. In the case where mixtures of thermoplastics and thermosetting resins are used, it may be necessary to effect a final heat treatment of the honeycomb, which may be continuous as by means of passing the honeycomb through a heated zone on a conveyor belt. The temperature required to cure the thermosetting resin is generally considerably less than the fusion temperature of the thermoplastic, and thus no distortion of the honeycomb would be expected.

The reinforcing fibers useful in preparing the subject invention honeycomb may be selected from any fibers which retain sufficient mechanical properties at the processing temperatures required for fusion of the thermoplastic. Thus when low melting point thermoplastics such as polypropylene or polyethylene terephthalate are utilized, fibers of high temperature thermoplastics, i.e., aramid, polysulfone, or polyetherketone may be utilized. However, preferred reinforcing fibers are those of glass, quartz, carbon, silicon carbide, and the like.

The reinforcing fibers may be utilized in many different forms. For example, random mats of staple fibers, which optionally may be needled in a needle or felting loom, may be utilized, as may mats of swirled continuous fibers. However, it is preferable to utilize reinforcing fibers in the form of unidirectional tapes or as woven fabric. Moreover, it is possible, within the same thermoplastic impregnated corrugated sheet, to utilize two or more layers of different fiber forms. For example a unidirectional tape may be sandwiched between two woven fabrics to provide greater strength in the tape fiber direction; or two woven fabrics may be oriented at a 45° angle to each other to provide a nearly isotropic assembly. By these expedients, the tensile and compressive strength may be tailored for the particular application. In a like manner, the impact resistance and electromagnetic properties may be altered by employing layers of dissimilar fiber materials, for example layers of fiberglass and carbon fibers and/or powder.

The fiber reinforced thermoplastic sheets used to prepare the honeycomb materials of the subject invention are prepared by impregnating one more layers of fiber reinforcement with the thermoplastic, mixture of thermoplastics, or mixtures of thermoplastic(s) and thermosetting resins. Suitable methods of impregnation are well known to those skilled in the art. For example, melt impregnation is particularly useful for thermoplastics with low fusion or glass transition temperatures, although the technique has been used with high melting thermoplastics as well. Melt impregnation is particularly successful with thermoplastics with low melt viscosities and is virtually mandatory with thermoplastics which have limited solubility. Solution impregnation, where the thermoplastic is soluble, is also utilized. In either case, the thermoplastic/fiber contents can be varied over a wide range. Preferably, the fiber content lies between 20 and 80 weight percent, more preferably between 30 and 70 weight percent, and most preferably between 60 and 70 percent. However, because of the selective heating aspects of the subject invention, sheets having exceptionally low fiber content, 100% thermoplastic fiber content, or even no fiber content may be used. The thickness of the fiber-reinforced thermoplastic sheet, or web, generally lies between 0.001 inch and 0.010 inch. Non-reinforced thermoplastic sheets, which can also be used in the subject process, may have the same thicknesses.

Honeycomb may also be prepared from 100% thermoplastic web material. These materials may consist of oriented non-oriented continuous or chopped thermoplastic fibers, for example of polyethylene, polypropylene, or polyester. Examples of such webs are Typar® and Tekton® polypropylene spunbonded web and Reemay® spunbonded polyester web available from Reemay Incorporated, Old Hickory, Tenn.; and Tyvek® spunbonded olefin high density polyethylene web available from DuPont. These materials, upon consolidation, may melt completely forming a solid thermoplastic web, or only some fibers may melt, forming a thermoplastic matrix containing thermoplastic fibers. The latter condition may also be realized when all thermoplastic spunbonded materials containing two different thermoplastics, for example, polyethylene and polypropylene, or a single family of thermoplastics having different melt temperatures are used.

Webs such as 100% spunbonded and calendared webs can be described as a 100% fibrous medium (where all the fibers are usually made from the same resin type) which when made up form extremely fine filament diameters, and calendared, becomes essentially impervious to fluid or gas flow. Therefore, in this process, they act as if they are made from a consolidated fiber/matrix composite or 100% resin film web and hence are able to be processed in a fashion similar to these one and two component webs described elsewhere in the application. They will melt along their bonding surfaces and thus can be joined together but retain their highly densified fibrous nature outside of the immediate area of bonding.

Figure 5A:
FIGS. 5A–5A—Various geometric corrugation configurations which may be used to prepare honeycomb.
Figure 5B:
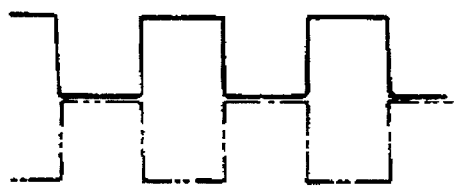
Figure 5C:
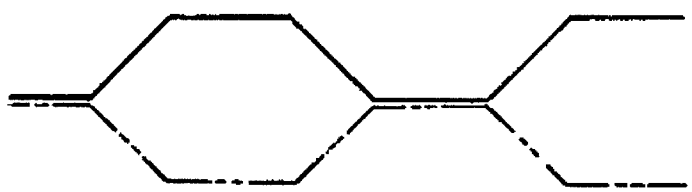

In preparing the honeycomb of the subject invention, the fiber reinforced thermoplastic sheet must be corrugated into a configuration which represents a half cell of the finished honeycomb. FIG. 5 illustrates three different half cell corrugation configurations. In 5A, the cell shape will be square or rectangular, depending upon the depth of the corrugations. In 5B, the corrugations are sinusoidal, forming a cell shape similar to base to base bells. In 5C, the half cell corrugation is trapezoidal, forming the most preferred hexagonal cell structure. In the remainder of the specification, the description of the process and of the apparatus utilized in the process will be directed to forming a honeycomb with a hexagonal cell structure. However, the modifications necessary to provide honeycomb of other cell shapes will be readily apparent to those skilled in the art.

The fiber-reinforced and non-fiber-reinforced sheets may be corrugated by conventional means, for example by compressing hot sheets between meshing toothed wheels as described in U.S. Pat. No. 3,356,555 and the copending parent application. Other methods, well known to those skilled in the art, may also be used. The corrugated sheets may be prepared in the form of a continuous ribbon whose width is equal to the thickness of the honeycomb core, or may be prepared as individual sheets whose length and width correspond to the honeycomb length and thickness, respectively. Of course, the sheet may be supplied in sizes larger than honeycomb dimensions and cut to shape, but this is wasteful of both time and material.

The corrugated sheets, in whatever form, may be corrugated long before use, or may be corrugated immediately prior to layup into honeycomb in an integrated manufacturing process. Corrugated fiber-reinforced sheets containing low modulus fibers such as high temperature thermoplastic or glass may be prepared in roll form and used subsequently. However, with carbon fiber and silicon carbide fibers, the modulus is so high that substantial bending is not possible, and thus these materials must be prepared ahead of time in sheet form, or alternatively, integrated into the process by corrugating just prior to or coincidentally with laying up into the honeycomb structure.

With reference to FIG. 1, the lowermost formers (1) which, for a hexagonal cell honeycomb, have a hexagonal cross-section, and which are secured by securing blocks (12), are inserted through the top layer of cells of a preformed honeycomb starter onto the bed rails (13). Means of insertion may be by electric servo motor, by pneumatic or hydraulic motors or rams, or other equivalent means. Topmost formers (4) are then inserted on top of the honeycomb with the formers occupying the antinode depressions in the top of the honeycomb core. Means for moving the rods (formers) and of raising and lowering them will readily suggest themselves to one skilled in the machinery arts. Further description of suitable methods may be found, for example, in U.S. Pat. No. 3,283,118 which is herein incorporated by reference. A corrugated sheet (not shown for clarity) is laid on top of the topmost rods such that the antinodes of the second sheet are in contact with the nodes of the honeycomb topmost layer. At least the node to antinode surfaces (demes) of the first and second sheets are heated, and pressure exerted to fuse the node to antinode surface. The lowermost set of formers are then withdrawn, raised, and inserted into the antinode depressions of the newly formed top row of honeycomb cells, becoming the topmost set of formers in the process. As a result, the honeycomb has been increased in size by one half cell height, or one entire completed cell row.

Further, with reference to FIG. 1, the height of both sets of metal formers (1 and 4) may be adjusted by raising or lowering the height of the bed frame (15). Various means may be used to accomplish such raising or lowering, such as the use of hydraulic or pneumatic pistons (16). The former securing blocks may be free floating, may be hinged, but preferably are regulated in their motion through the use of linear bearings (17) attached to pillar blocks (18). Other equivalent means of raising and/or lowering the formers will readily suggest themselves to one skilled in the art.

After the topmost corrugation has been fused to the existing honeycomb, the lowermost bars (1) as previously stated, are withdrawn, raised by pistons (16) to a height such that the bars may clear the thickness of the most recently fused node-antinode surfaces, and reinserted, becoming the topmost formers in the process. Both bed frames are then lowered by one half cell height and the now topmost bars lowered slightly to establish pressure between the two sets of formers and the honeycomb material located between them. The raising and lowering sequence may be varied as long as the final result is the same or its equivalent. In FIG. 1, consolidation is by tooth roller (19) and hot air heating means (not shown).

Figure 2C:
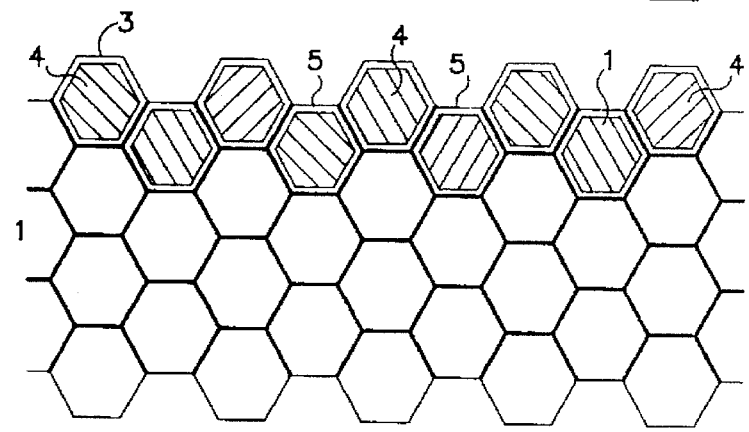

The honeycomb forming sequence is shown by FIGS. 2A–2C, with are a section taken through FIG. 1, but which honeycomb material in place. In FIG. 2A at (1) are the lowermost row of bars of formers which are located in the topmost cell layer of a honeycomb (2). The topmost row of formers (4) is inserted into the antinode depressions and clamped down trapping the honeycomb (2) between the lower (1) and topmost (4) formers. A layer of corrugated fiber reinforced thermoplastic web or corrugated unreinforced web (3) is laid atop the topmost bars (4) and consolidated at the node-antinode depression demes (5). The lowermost formers (1) are then withdrawn, raised by an amount equal to or greater than the consolidated node-antinode deme thickness and reinserted, resulting in FIG. 2B.

In FIG. 2B, the numbering of FIG. 2A has been retained. Note that the lowermost formers (1) of FIG. 2A have become the uppermost formers (1) of FIG. 2B while the uppermost formers (4) of FIG. 2A are now the lowermost formers (4) of FIG. 2B and the honeycomb (2) has been increased in width by one half cell. Another layer of corrugated web is laid down, consolidated with heat and pressure, and the lowermost formers (4) withdrawn, elevated and reinserted, once again becoming the topmost formers (4) in FIG. 2C (as also in FIG. 2A), but note that the honeycomb structure (2) in FIG. 2C has now been increased in width by a full cell. This process is repeated until a honeycomb of the desired width is created.

Figure 2D:
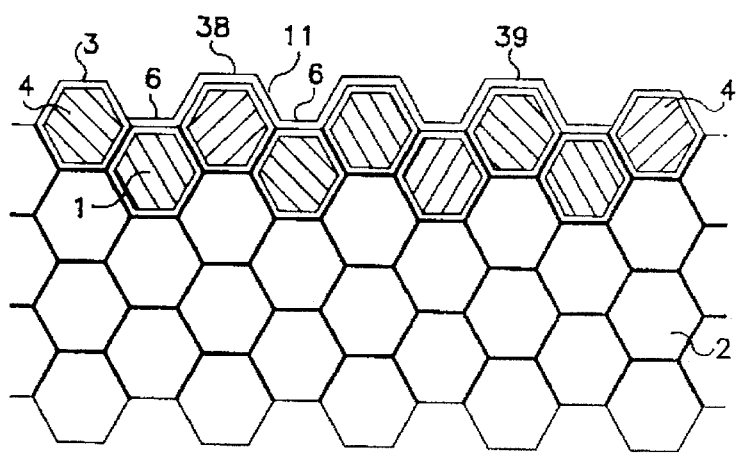
FIG. 2D—Side view showing a secondary layer atop a primary layer bonded at the various demes.

In FIG. 2D a secondary web (11) has been laid over the last (primary) web (3) and fused at the antinode-antinode demes (6). The former positions have not been changed from FIG. 2C and thus no new row of cells is formed, only a thicker cell wall. At (38), the node-node demes have not been fused, while at (39) they have. By this process, a portion of the topmost layer has been increased in thickness and strength.

In the practice of the subject invention according to the previous description, it is necessary to heat the various abutting surfaces and to apply pressure to cause these surfaces to melt and diffuse into each other forming a strong bond. This process may be assisted in some cases by depositing a suitable film adhesive on the node and antinode facing surfaces; however, this approach is generally undesirable as it requires additional steps and material. Many equivalent means of heating and melt fusing the node to antinode contact surfaces may be readily envisioned, but it is preferable to fuse more than one deme at the same time.

Figure 3:
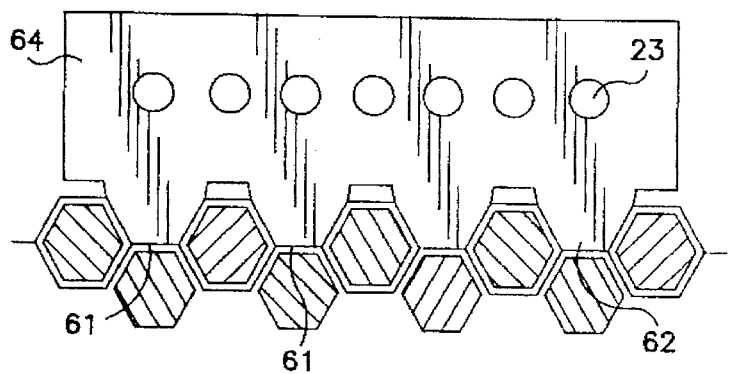
FIG. 3—A side view of a bed showing a hot shoe used to achieve selective heating.
Figure 3:
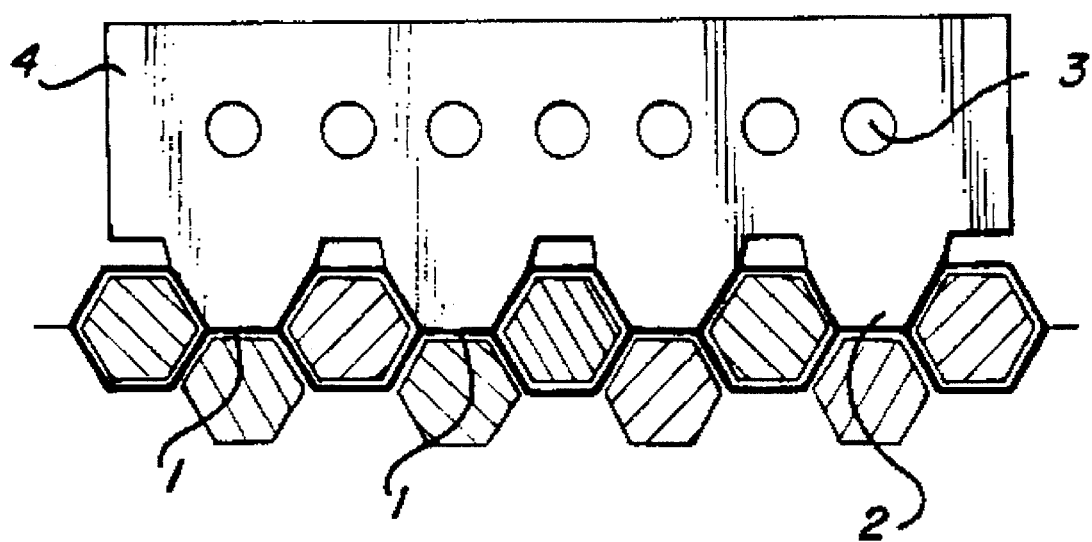
Figure 6:
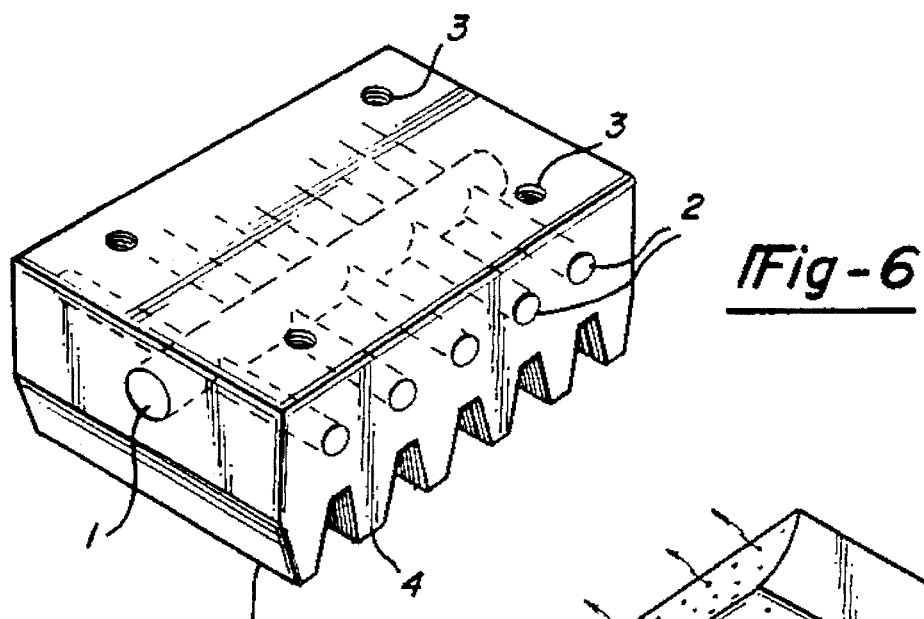
FIG. 6—Isometric view of one configuration of hot shoe or platen selective heating means.

One such means, a hot shoe is depicted in FIGS. 3 and 6. With reference to FIG. 3, the hot shoe (64) is positioned such that the projections (62) on the bottom of the hot shoe correspond to the antinode hollows (61) on the top fiber reinforced thermoplastic or nonreinforced thermoplastic corrugated sheet. The hot shoe is wiped across the honeycomb in a direction parallel with the corrugations, that is across the thickness direction. The bottom surface of the hot shoe, which may be made of metal, ceramic, graphite or other material, has projections (62) on the bottom whose shape and spatial frequency coincide with the cell shape and width of the honeycomb. The width of the hot shoe preferably coincides with the length of the honeycomb to be produced, as such size permits fusion of an entire half cell depth of honeycomb across the length of the honeycomb in one pass of the hot shoe. However, it is also possible to utilize a hot shoe whose width is, for example, a whole fraction of the honeycomb width and to index the hot shoe such that it makes multiple passes. Alternatively, multiple hot shoes may be utilized, each of which fuses node-antinodes along a portion of the honeycomb length.

The hot shoe also contains an integral heating means sufficient to maintain the bottom surface of the hot shoe at or above the fusion temperature of the thermoplastic. This heating means may be resistance heating coils, cartridge heaters, or hot air supplied through flexible metal tubing. Cartridge heaters are depicted in FIG. 3 at (23) from the end. FIG. 6 shows the hot shoe containing an air manifold. Hot air for heating, or cool air for cooling is supplied to manifold inlet (21) and distributed to heating and cooling passages (22). Mounting holes (33) are used to mount the hot shoe or platen on the assembly (not shown) used to traverse the platen across the honeycomb under pressure to effect fusion. Preferably, the longitudinally extending projections (20) are radiused across surface (25), along the honeycomb width direction, to more efficiently transfer pressure to the node-antinode contact area and to prevent resin buildup on the shoe surface. While it has not proven necessary to apply release agents to the shoe or the thermoplastic sheet surface, such coatings may be desirable in certain cases. It may also be possible to coat the surface of the projections (20) with a slippery or non-adherent coating to assist in preventing resin buildup. This technique is particularly useful with the lower fusing thermoplastics, but may present problems with thermoplastics of high melting temperatures due to the durability of the coating and its inability to adhere to the hot shoe surface at elevated temperatures. An advantage of the hot shoe method of bonding is that the hot shoe does not have to be cooled down prior to leaving the fusing area since it is removed from this area using a sliding motion.

An alternative means for fusing the node-antinode mating surfaces of the corrugated fiber-reinforced thermoplastic sheets is to utilize a heated platen. Such a platen is also illustrated by FIG. 6. The ridges or projections (20) from the surface of the platen correspond to the shape and spatial frequency of the honeycomb cells. As is the case with the sliding hot shoe, the crossection may be square for cell shapes which have a flat node-antinode surface even though the cell shape is hexagonal as there is normally no necessity to heat the non-mating surfaces of the cell (the cell walls). The heated platen is pressed onto the exposed honeycomb surface for a time and at sufficient pressure to cause fusion at the node to antinode surfaces of the corrugated thermoplastic sheets. The pressure required is often 50 psi (0.34 Mpa) or greater at the node-antinode surface which translates to 45 tons of pressure on a 12"×48" (30.5 cm×112 cm) platen surface. This large amount of pressure creates drawbacks to the use of such platens as it requires both the platen as well as the machine and machine bed to be of substantial construction. The essential difference between the hot shoe and platen is that the platen is placed onto the honeycomb to be consolidated with generally only an up and down motion, while the hot shoe is wiped across the honeycomb with a sliding motion. Also, hot shoes are generally radiused across surface (25) of FIG. 6 resulting in concave teeth which provide for less resin pickup and which can be applied to the surface to be consolidated in either a rolling motion or a sliding motion.

An additional drawback of platen fusing is that the platen must be cooled to below the thermoplastic fusion temperature before removing from the bonding surfaces as the platen is not normally removed by a sliding motion. If the temperature is too high, resin lift-off may occur. Even at lower temperatures, resin transfer may be a problem, thus use of release agents may be required. Standard release agents such as Frekote® releases may be metered or painted onto the antinode which lies atop of the node-antinode surface which is in contact with the platen projections, or may be applied to the top surface of the platen projections, for example, by means of a roller or other equivalent means. Care must be taken to insure that the release coating does not contact the node surfaces of the top layer of corrugated thermoplastic sheets which will be bonded subsequently to the antinode of the yet-to-be-positioned next sheet.

Because of the pressure to be applied by the platen, the formers present in the assembly may bend downwards, especially along the central portion most remote from the bed edges. To ensure adequate and uniform pressure along the entire honeycomb width, the surface of the platen may be machined slightly convex, as indicated previously, so as to take into account the displacement of the rods.

Because the platen must go through heating and cooling cycles, the rate at which these cycles may be performed is important from a production standpoint. For this reason, it may be advantageous to use platens constructed of monolithic graphite. Such platens are described in copending U.S. patent application Ser. No. 07/513,634 filed Apr. 24, 1990 and now abandoned, entitled "Monolithic Graphite Press Platens and Their Use in Consolidating Fiber Reinforced Structural Materials," which is herein incorporated by reference. To protect the soft graphite surface, the graphite platen may be coated with a thin metal coating, as described in copending U.S. application Ser. No. 07/488,932 and now abandoned which is also herein incorporated by reference. The graphite platens have the double advantage of higher heat transfer rates, often double that of steel platens, and further that the temperature uniformity across the platen surface is greater.

Heated tertiary formers may also be utilized, but this method presents problems with uniformly applying pressure, although a platen above the rods may be utilized to avoid this drawback. An alternative method of fusing is to supply heat to the node-antinode surface by suitable means, for example, by focused infrared radiation, ultrasonic energy, laser energy or hot air, and to use one of the previous described devices, i.e., a shoe, platen, rod, or other equivalent means merely to supply pressure. These devices may also require some heating to offset the heat transfer which will of necessity take place during the pressurized fusion. However, in this case, the heating and cooling cycles and degree of heating will be substantially less as a substantial portion of heat is applied to the node-antinode surface itself rather than being supplied solely by the shoe, platen or rod. By far the most rapid processing is obtained when only the fiber-reinforced or unreinforced web itself, with its low thermal mass, is heated.

Figure 4:
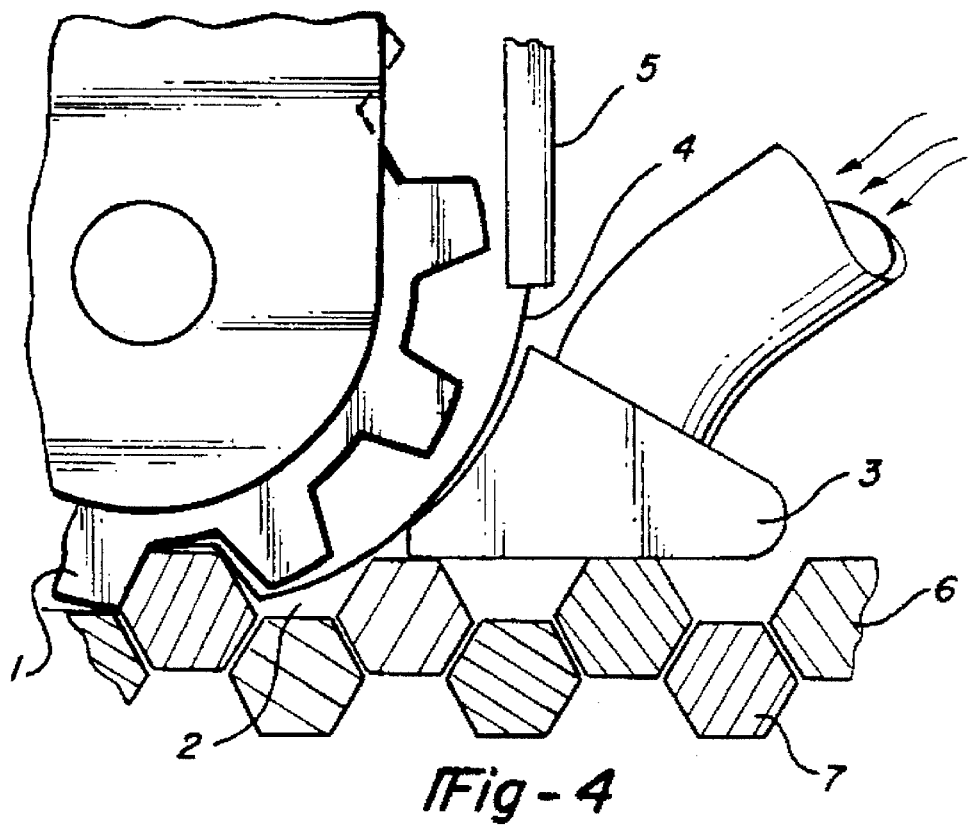
FIG. 4—A side view showing the use of a toothed wheel for achieving pressurized fusion of node to antinode contact areas with integrated corrugation of fiber web by hot air impingement.

An alternative process for the preparation of thermoplastic honeycomb is illustrated by the apparatus in FIGS. 4, and 9–11. This method is similar to that heretofore described, however the fusion means is improved and the corrugation step may be incorporated into the process. In this preferred method, the lowermost formers (1) are inserted through the topmost honeycomb cells into the bed frame as before, the topmost rods (4) inserted, and a corrugated fiber-reinforced thermoplastic sheet positioned atop the topmost rods. The corrugated sheet or web may be precorrugated or may be corrugated as it is layed down. The node-antinode mating surfaces are then selectively heated, by dielectric heating, focused infrared radiation, hot gas or other equivalent means, and the pressure required for fusion supplied by a toothed cylinder moving transverse to the direction of the corrugations (along the honeycomb length). This combination can also be used parallel to the cell direction if the web is already in place and held there by means of tertiary formers. In some instances, it may be desirable to shield the non-contact areas of the top thermoplastic sheet from the heat source by a suitable baffle with longitudinally extending slits whose spatial frequency corresponds to the node-antinode frequency and location. This method, sans baffle, is illustrated by FIG. 4. In FIG. 4, toothed cylinder or wheel (31) supplies pressure to the node-antinode contact area (32) as it rolls across the honeycomb top surface. The toothed wheel preferably has a width equal to the honeycomb thickness, or a substantial fraction thereof, i.e. greater than one third the thickness dimension, preferably greater than one half the thickness dimension. Heating means (33), here a jet of hot gas, precedes the path of the cylinder. The teeth of the cylinder advantageously have a convex surface such that pressure is smoothly applied with the rolling motion. Uncorrugated web material (34) is supplied through guide (35). Corrugation and consolidation are thereby integrated into the manufacturing process. The topmost (4) and lowermost (1) formers are withdrawn and reinserted as previously described with reference to FIGS. 1 and 2A–2C.

Figure 8A:
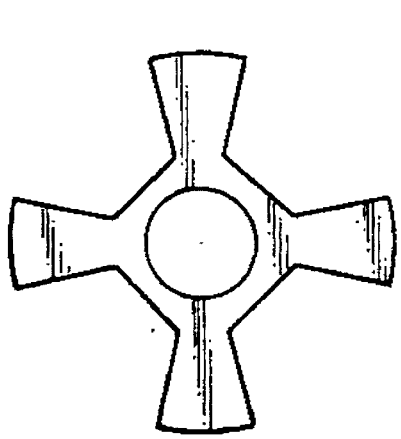
FIGS. 8A–8B—Alternative geometries of 4 and 5 toothed corrugation and/or consolidation rollers.
Figure 8B:
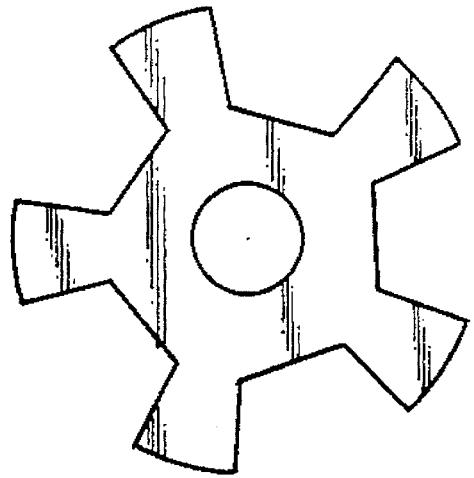

Instead of a toothed cylinder, a squirrel cage cylinder having bars of the appropriate geometry may be used. However, this method suffers from the dual drawbacks that the rods may distort, particularly for honeycomb of fine cell width, and that the bars do not have the same thermal mass of the cylinder. The cylinder or cage is not heated, but rather is desired to be maintained at a sufficiently low temperature such that resin transfer is avoided. By the toothed roller method honeycomb consolidation may take place at a speed of 15 lineal inches/sec (38 cm/sec) or higher. Alternative geometries of 4 and 5 toothed rollers are shown in FIGS. 8A and 8B, respectively. An elongated plunger having the appropriate geometry and other equivalent means may be utilized as well.

In this most preferred embodiment, the thermoplastic web is corrugated and used in one integrated step. By this method, the problems associated with handling precorrugated webs are avoided. This is important, as it is sometimes difficult to prepare corrugated material to exact dimension. Furthermore, it is often difficult to feed such material onto the top honeycomb surface without stretching or distorting the web and thus the node to antinode spatial relationship. In this preferred method, the thermoplastic web is supplied from a roll in an uncorrugated state. The web is laid down atop the topmost layer of honeycomb and both the honeycomb and web simultaneously heated. The web is simultaneously corrugated and fused by the trailing toothed wheel as previously described.

Figure 11A:
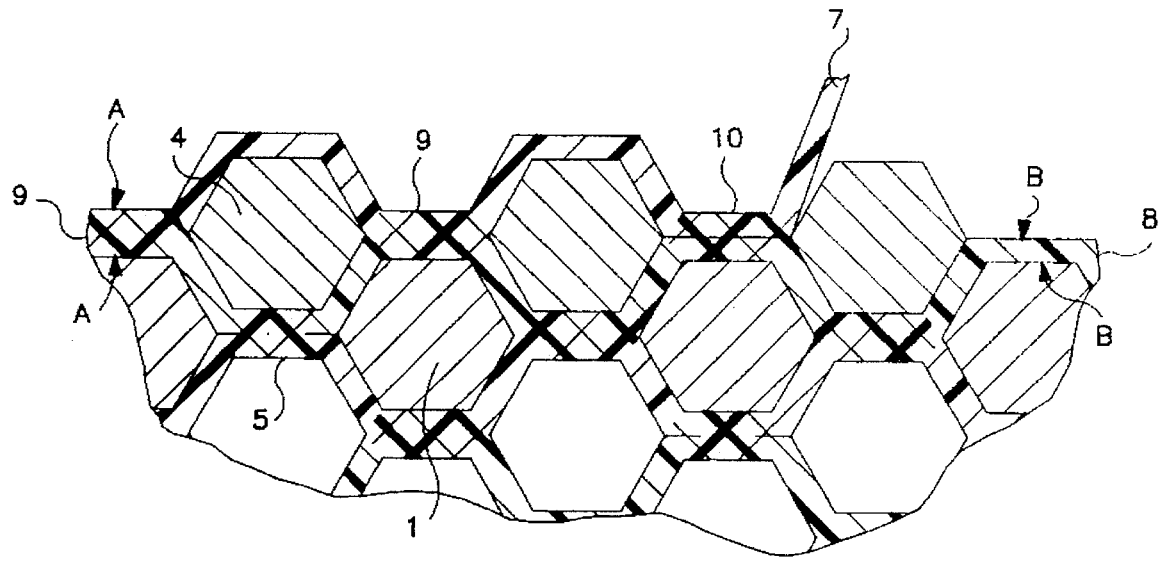
FIGS. 11A–11B—Illustrates more closely the web to web relationship in the top honeycomb layer and the difference between unconsolidated and consolidated web thickness.
Figure 11B:
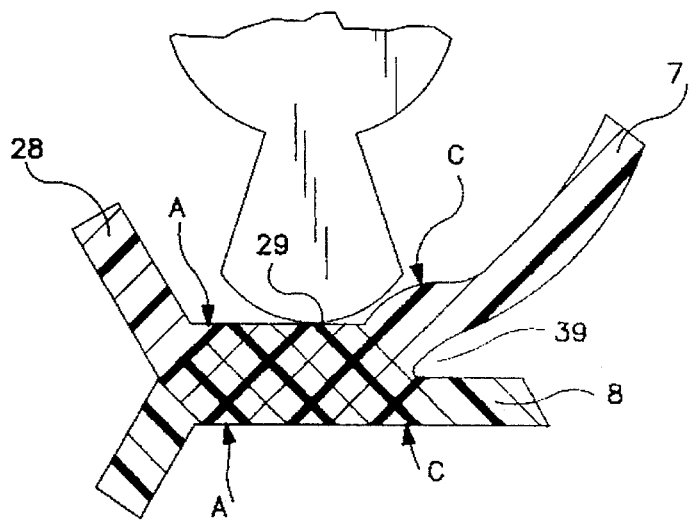

FIGS. 11A and 11B illustrate in an enlarged fashion, the consolidation process, in this case utilizing a toothed roller, the preferred method, with hot gas, microwave, or radiant heating (heating means not shown). In FIG. 11A, the upper web (7) of fiber reinforced web lies atop the topmost set of rods of which (4) is the leftmost member in the drawing. The bottom web (8) of the previously formed half-cell lies atop the lowermost set of rods of which (1) is the leftmost member completely shown, and between the topmost and lower most rods. The unconsolidated, one web thickness of bottom web (8) is shown at B—B. At (9) in FIG. 11A is shown the consolidated web which across section A—A is generally about 80 percent of double the B—B thickness. During corrugation/consolidation, the webs are heated and corrugation/consolidation roller (29 in FIG. 11B) lays down and consolidates the webs at (10 in FIG. 11A). FIG. 11B illustrates the degree of compaction which may vary from virtually 100% with all thermoplastic webs to 70–50 percent or less of the original two ply thickness with fiber-reinforced materials. The higher the degree of thermoplastic impregnation, the greater the anticipated degree of compaction.

Again, with reference to FIG. 11B, section C—C in the unconsolidated two ply thickness while the consolidated thickness at A—A is approximately 80 percent of the C—C thickness. At (28) is shown the side wall of the honeycomb which may be substantially the same thickness as the unconsolidated web, or which may, especially in the case of the high thermoplastic content webs, be somewhat less than that thickness. The geometry of the roller may be adjusted to supply high, little, or no pressure on these side wall surfaces.

Again with reference to FIG. 11A, the fully consolidated node-antinode deme is shown at (9) and the as yet uncorrugated portion of upper web (7) is simultaneously corrugated and consolidated by the roller (not shown) by heating with heating means (not shown) and being compressed between the roller and the topmost set of bars (formers).

Figure 9:
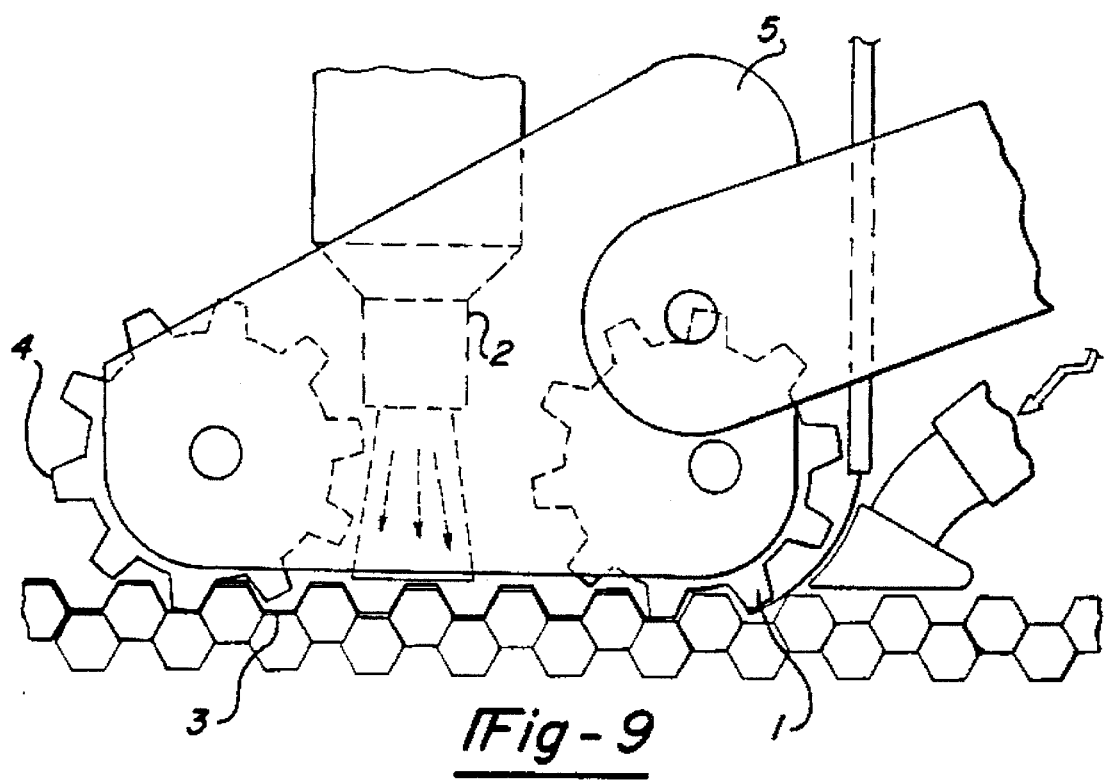
FIG. 9—Double toothed-roller embodiment showing second roller further consolidating the web.

FIG. 9 illustrates a secondary bonding consolidation embodiment. Trailing the path of consolidation/corrugating wheel (41) is an optional secondary fusion heat source (24) which heats the already fused node to antinode surfaces (36) for a second fusion/consolidation in order to achieve more complete bonding. Pressure for bonding is supplied by second roller (42); while heat is supplied by secondary air jet (24). The rollers are mounted in carriage (45) which, upon reaching the end of the bed of formers, is raised and traversed back to the start position after severing the end of the web. The secondary bonding technique may also be used with the continuous dual corrugating/consolidating roller system portrayed in FIGS. 10A–10C. In this case, two pairs of secondary bonding wheels and secondary jets are utilized, one on the leading and one on the trailing side of the rotatable central corrugation/consolidation wheels.

Figure 10A:
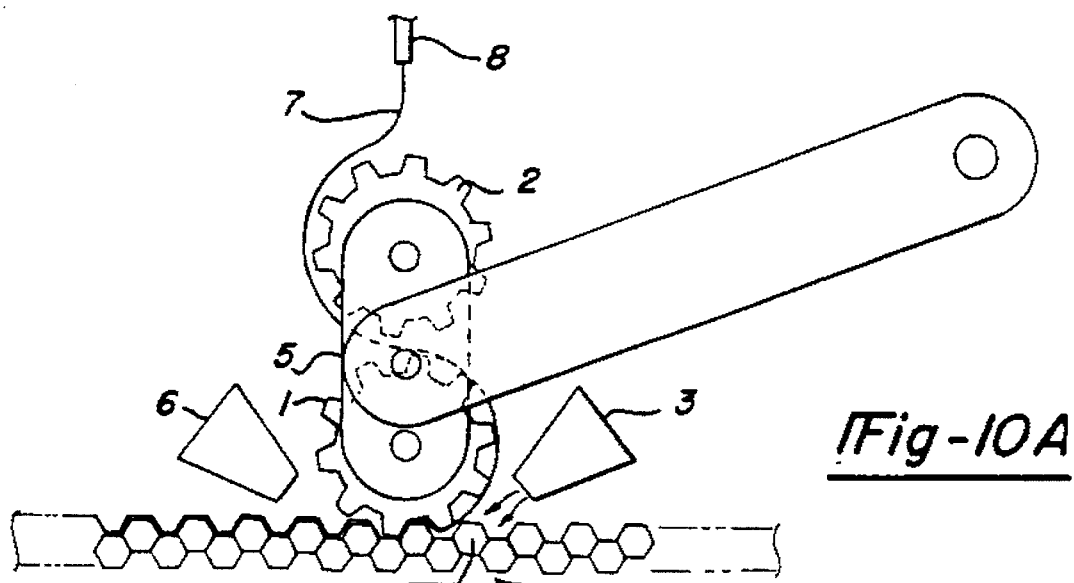
FIG. 10A—Two roller embodiment allowing bidirectional corrugation/consolidation with wrapover at end of the bed.
Figure 10B:
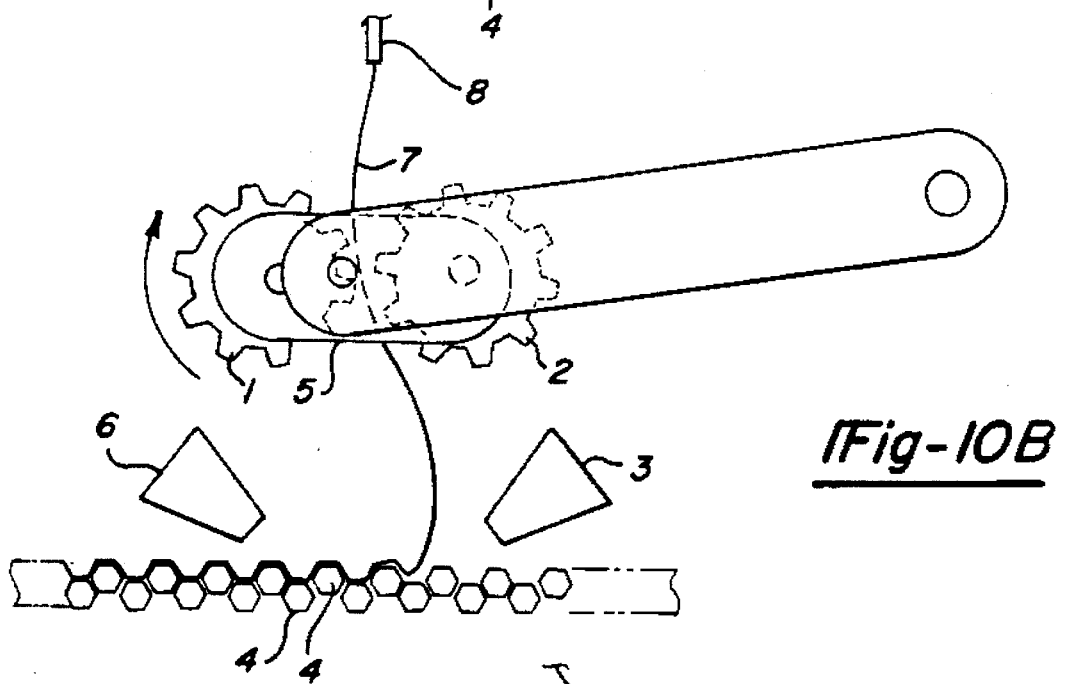
FIG. 10B—The two roller method of FIG. 11 showing roller assembly rotation.
Figure 10C:
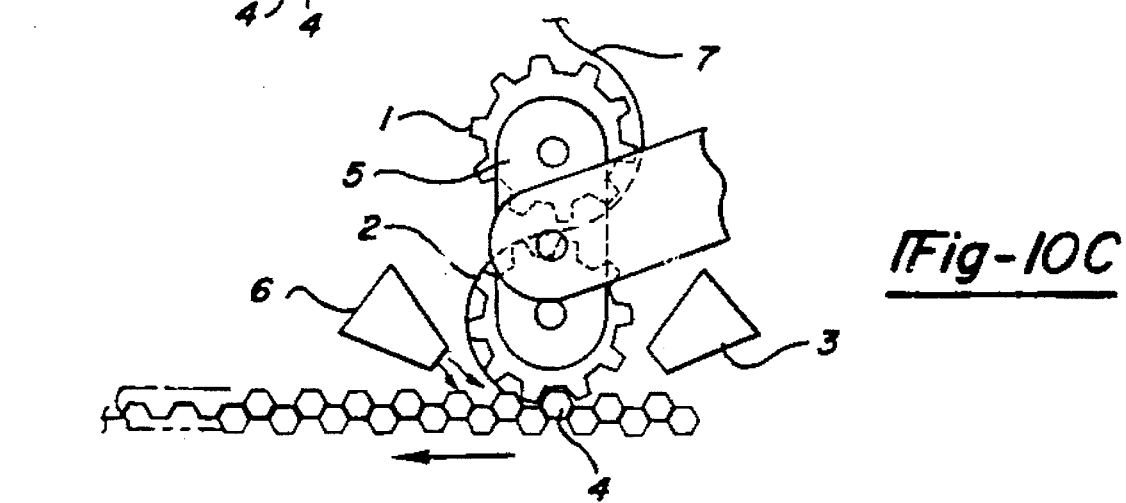
FIG. 10C—The two roller method of FIG. 11 at the beginning of reverse travel.

FIGS. 10A–10C illustrate a method of forming honeycomb which eliminates traversing the toothed roller and selective heating means back to its initial starting position prior to laying down the next web. In this embodiment, two hot air heating means are used. The thermoplastic web is laid down as the twin consolidation and corrugating rollers (41) and (42) pass left to right. The bottom most roller (41) performs corrugations and consolidation. Uncorrugated web (34) is supplied through guide (35). Hot air for corrugating and fusing the web is produced by hot air jet (33) similar to that shown in FIGS. 7 and 12. When the advancing web reaches last former (4) at the edge of the bed, the gas flow to heating means (33) is shut off, the bottom-most row of formers is retracted, raised by an amount slightly greater than the height of the consolidated node-antinode thickness, reinserted becoming now the topmost row of formers, and lowered down onto the honeycomb, preferably exerting pressure between the honeycomb topmost layer and the lower set of formers. The carriage (45) containing the twin corrugating/consolidating rollers then rotates clockwise as depicted in FIG. 10B as the rods are exchanged thus wrapping the web around the end topmost former (4 in FIG. 10C). The rollers then traverse right to left with the left most air heating means (26) turned on to heat the web to the consolidation temperature. At the end of its travel, the left most hot air jet (26), is turned off, the bottom-most formers retracted, raised, inserted and clamped as before, and the consolidation wheel carriage rotated counter-clockwise to the original position. This process is repeated until the desired honeycomb width is achieved.

FIG. 10B shows the apparatus of FIG. 10A in partial clockwise rotation, in this case partway down the bed rather than at the end. It is possible to make any particular former the "last" former. FIG. 10C shows the apparatus traversing right to left with hot air jet (26) supplying heat while jet (33) is shut off. The uncorrugated web (34) is supplied through guide (35) mediate to the two rollers (41) and (42).

Figure 12:
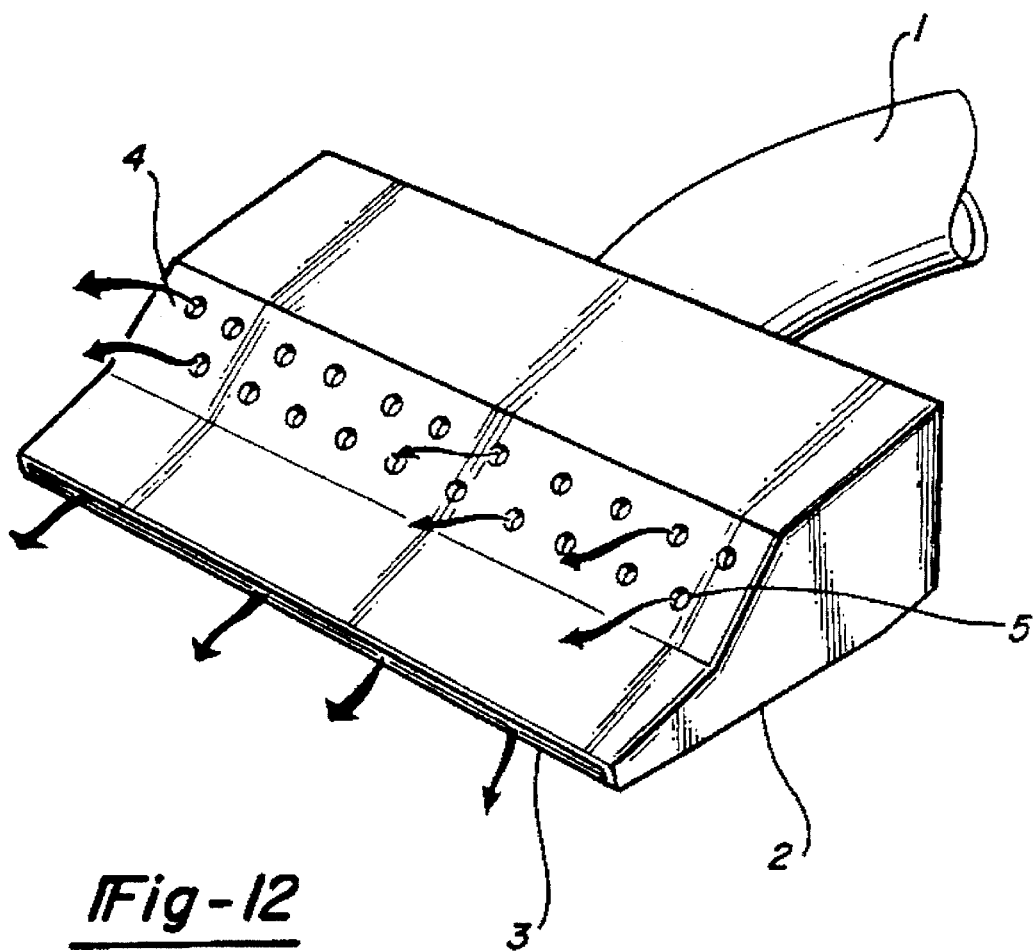
FIG. 12—Another configuration of hot gas heating means.
Figure 13A:
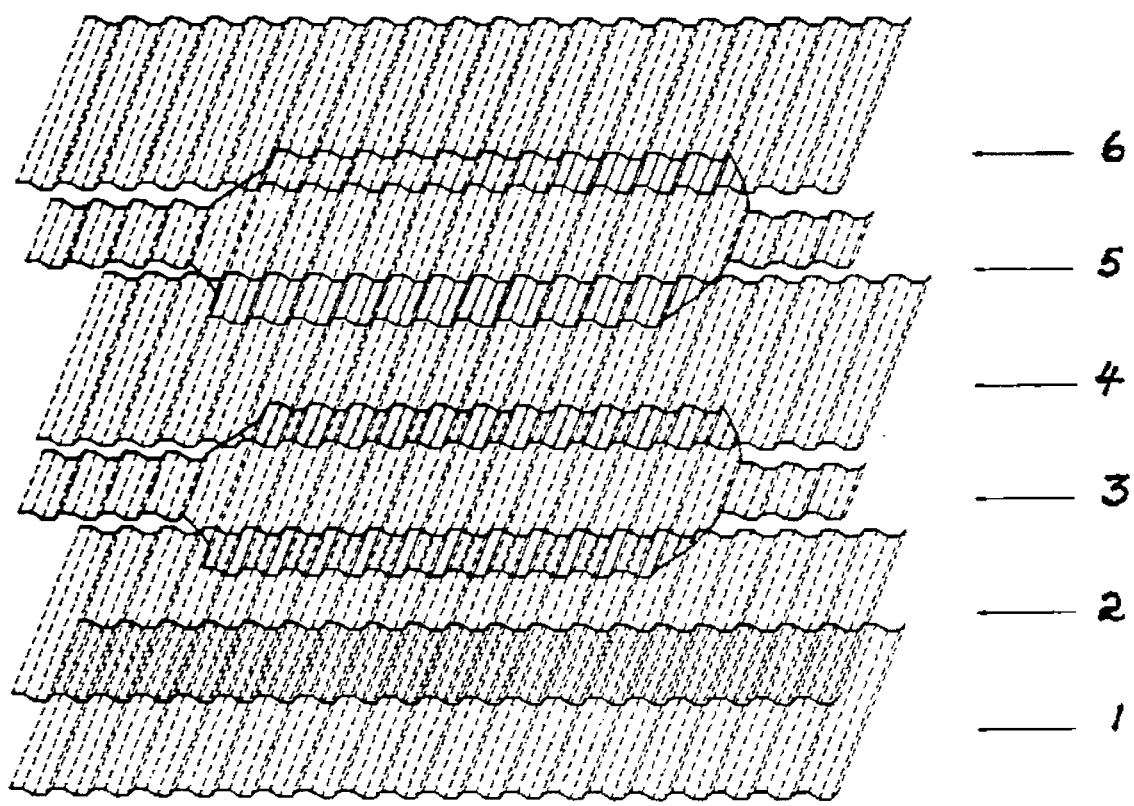
FIGS. 13A–13B An expanded view of thermoplastic webs which may be utilized to form a honeycomb containing areas having different physical properties, and an "X-ray" view of such a structure from the top.

FIG. 12 depicts a configuration of gas impingement jet (27) which has been found to eliminate the lack of total consolidation of the node-antinode demes when used with a four or five toothed consolidation roller. With reference to FIG. 12, the major hot gas delivery through tube (30) exits the jet through slit (37). Bleed holes (55) result in hot gas jets (44) which impinge upon the lower surface of the uncorrugated web being applied. The extended nozzle contains an internal baffle separating the major gas stream from the bleed stream. By use of the extended nozzle, the shadow area in the antinode depression is eliminated, resulting in complete consolidation.

The examples below have been run with numerous fiber reinforcement, for example, glass fiber webs of 108, 112, 120 and 7781 woven styles and 1 to 3 oz. non-woven webs, carbon fiber webs or collimated unidirectional tape, 282 woven style, and 0.5 to 4 oz. non-wovens; and Nomex® fibers in a Kendall style 1209 non-woven web. Tyvek® style 1085A spunbonded 100% polyethylene web, Typar® style 3353 100% polypropylene web, and Reemay® style T-550 100% polyester web have also been used. Resins used were polyethersulfone, polyphenylene sulfide, polyetherimide, polyetheretherketone, polyetherketoneketone, ULTRASON® 2000 liquid crystal polymer, polyethylene, polypropylene, polyethlyene terephthalate and nylon. Examples 1–7 relate to forming a uniform honeycomb while Example 8 corresponds to preparing a honeycomb containing areas having different properties as claimed in the subject invention.

Figure 14B:
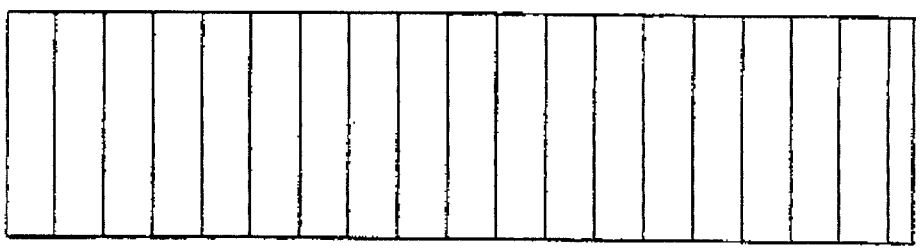
FIG. 14A–14B Normal core viewed from face of core and a section perpendicular to the face showing single layer construction throughout.
Figure 14A:
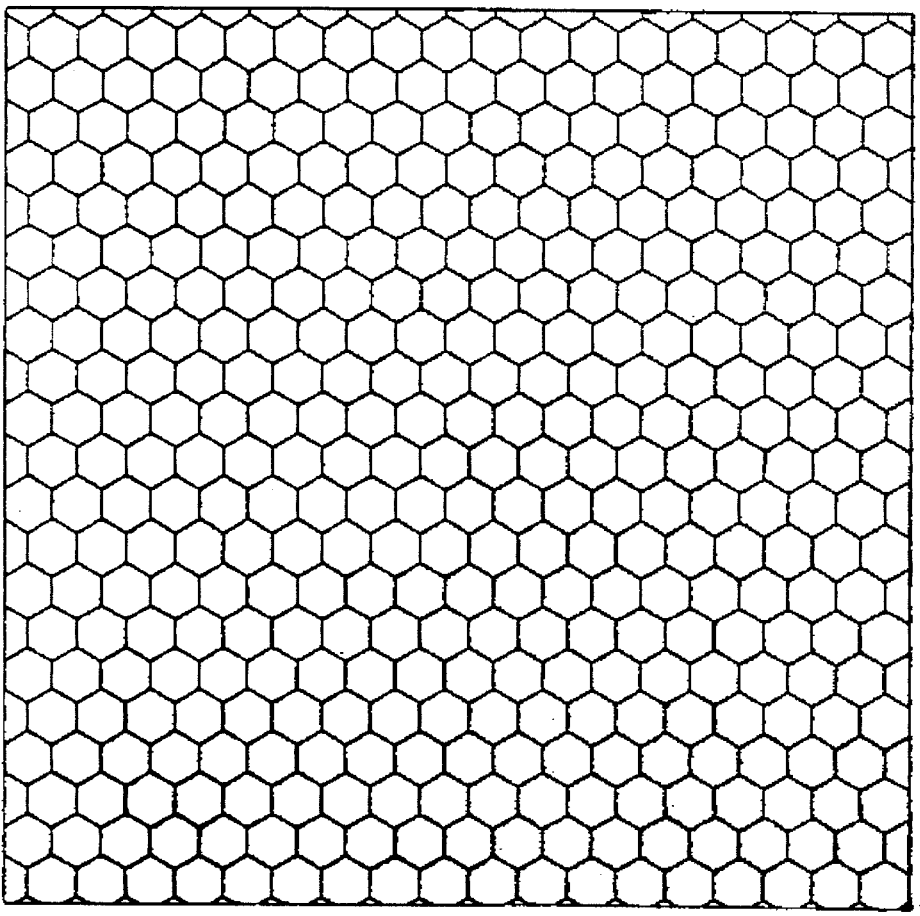

In FIG. 14A, a normal honeycomb which is non-reinforced, but which may be prepared by the basic process herein is illustrated by a view of the face of the honeycomb. This view shows that the cell wall thicknesses are relatively uniform. In FIG. 14B, a section orthogonal to the honeycomb face at A—A shows that the honeycomb is produced by successively bonding unitary corrugations of thermoplastic web. The physical properties of such a honeycomb would be expected to be relatively uniform throughout the structure.

Figure 15D:
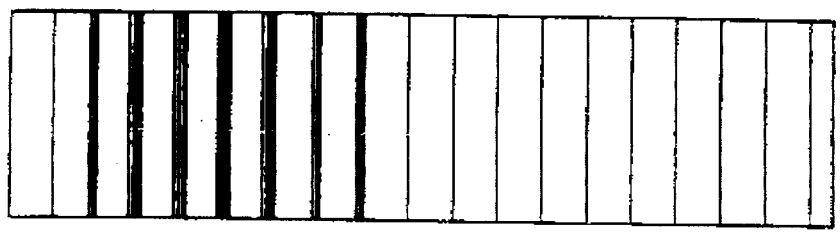
FIG. 15A–15D Reinforced core viewed from face of core and sections illustrating addition of one, two, and both two and three reinforcing layers.
Figure 15C:
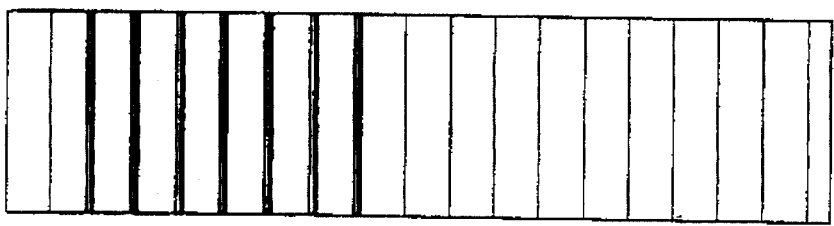
Figure 15B:
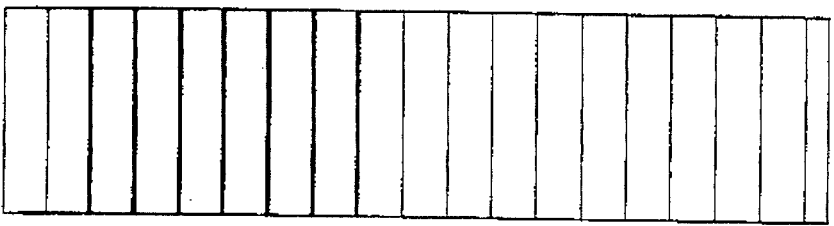
Figure 15A:
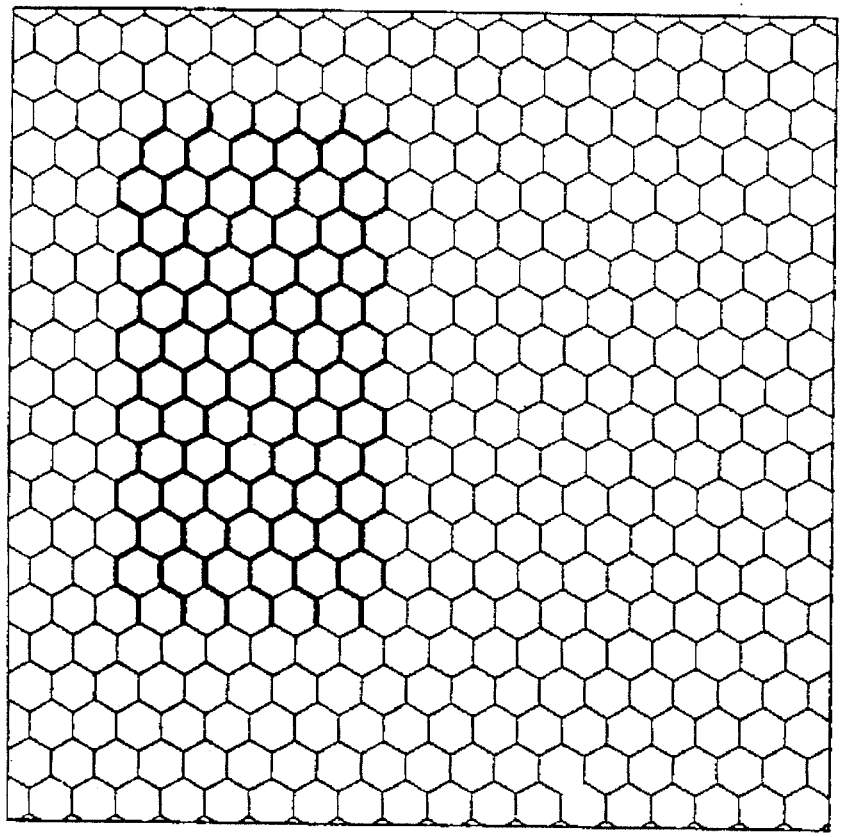

In FIG. 15A, the face F of a honeycomb of the claimed process shows an area R of reinforcement having different physical properties than the remainder of the honeycomb. Sections orthogonal to the face along A—A are illustrated by FIG. 15B (one additional layer of web (8) in the densified area); FIG. 15C (two additional layers $(8, 8^1)$ in the densified area); and FIG. 15D (two additional layers (8,8¹) and 3 additional layers (8,8¹,8¹¹) in the densified area).

Figure 13B:
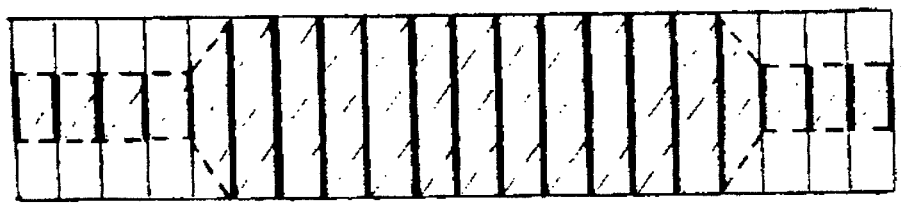

FIG. 13A illustrates an array of corrugated material useful in providing a honeycomb having areas with different physical properties within the honeycomb structure. Layer (71) is an ordinary, or primary layer, as is layer (72). These webs, when placed directly atop one another, will have their antinodal and nodal surfaces,respectively, adjacent to one another for bonding together to produce a row of honeycomb cells. Layer (73) is a secondary layer whose antinodes and nodes correspond with the antinodes and nodes of primary layer (72). When the node to node and/or antinode to antinode surfaces are bonded, no new row of cells will be produced. Rather, a reinforced area of irregular shape—the space of layer (73), will be produced. Layer (74) is an ordinary web and will thus create a new layer of cells. Layer (75) is a secondary web and will thus reinforce layer (74) without adding a new row of cells. Layer (76) is a further primary layer which will create a new cell row. FIG. 13B is an "x-ray" view from the top of the completed honeycomb. The heavy lines and shading delineate the bounds of the embedded area of greater reinforcement in a honeycomb prepared from the layers of FIG. 13A.

EXAMPLE 1

A variety of thermoplastic fiber reinforced honeycombs were prepared with ⅛" and ¼" cell sizes by utilizing the device shown in FIG. 1 without the toothed wheel consolidation roller but with rolling and sliding hot shoes. The rolling hot shoe had a 7 inch radiused surface heated by a Watlow 2000 watt cartridge heater heated to 1000° F. (538° C.) which resulted in a contact surface temperature of 700°–900° F. (371°–482° C.). Pressure on the node-antinode surface varied between 80–140 psi. Bonding speed in the direction transverse to the corrugations (along the corrugations length was 2–6 inches (5–15 cm/sec.).

The sliding platens utilized varied from 1" (2.5 cm) to 6" (15 cm) in the node direction. Single node-width sliding hot-shoes (sliding platens) as well as those corresponding to the width of the entire honeycomb were utilized. Transverse speed was varied as with the rolling platen described before. Platen materials utilized included stainless steel, aluminum, and monolithic graphite. Heating was by strip heaters (1000–3000 watt Watlow) which were in constant contact with the platen surface. The single node sliding platen utilized a ⅛" diameter cartridge heater wrapped with 2 mil stainless steel foil, this heating device comprising the bottom-most surface of the platen. Heater temperatures varied from 800°–1200° F. (427°–649° C.) resulting in temperatures at the web surface of from 650°– 850° F. (343°–454° C.). Typical pressures at the web surface were between 80 and 160 psi.

EXAMPLE 2

The procedures of example 1 were followed, but a fixed platen as in FIG. 6 (no rolling or sliding motion) was utilized. Graphite and ceramic platens were the platen materials of choice since the platens must cool down before removing from the fused node-antinode demes. Rapid thermal cycling dictated a platen with low thermal mass. Strip heaters contacting the top of the platen surface proved slow to heat up (7–10 min/cycles). Typical heater temperatures were in the range of 1200°–1500° F. (649°–816° C.). The preferred heating source was an HTT Moen System of hot air impingement onto the top of the platen. The orifice size of the air jets were in the range of 0.020" (0.05 cm) to 0.100" (0.25 cm) with the ratio of the distance to platen surface/ orifice size lying between 2 and 8. Compressed air at 1200°–1600° F. (649°–871° C.) was fed at a back pressure of 10–20 psig. By use of this method, cycle time of 1–4 minutes were observed with thermoplastic matrices having Tg's in the 400° F. (204° C.) range and melt temperatures between 650° and 800° F. (343° to 427° C.) such as PEEK polyetherketone or PES polyethersulfone.

EXAMPLE 3

In the honeycombs prepared by this example, a precorrugated sheet was layed up as in example 1 and hot air or infrared heat used to heat the thermoplastic web. Consolidation was performed by a rolling, sliding or fixed platen as in examples 1 and 2. A disadvantage of this method is that a clamping mechanism must be used as without it the corrugated web distorts upon heating, and the node-antinode demes are dislocated.

EXAMPLE 4

The former bed of FIG. 1 is utilized, with a ten tooth corrugation/consolidation roller as depicted in FIG. 4. The pitch and geometry of the roller teeth is based upon the desired honeycomb geometry (former shape) taking into account the thickness of the web. Conventional design techniques were used to determine the geometry appropriate for each trial. The tooth wheel geometry used in this example is as depicted in FIG. 4.

Figure 7:
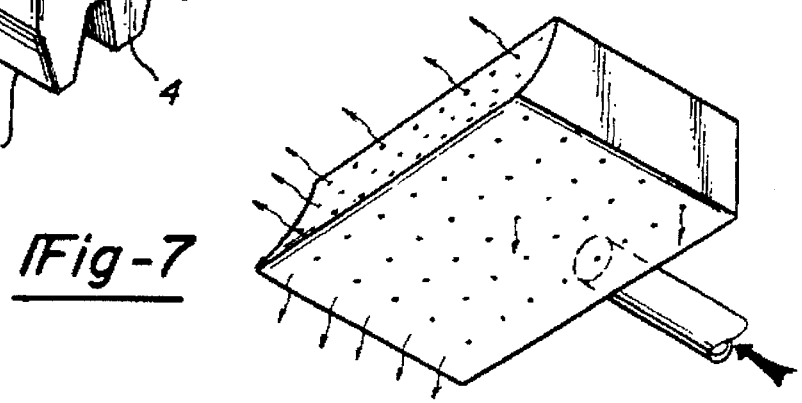
FIG. 7—Isomeric view of one configuration of hot gas impingement heating means.

A hot air jet with geometry shown in FIG. 7 was used to supply hot air to the uncorrugated thermoplastic web just prior to its corrugation/consolidation as shown in FIG. 4 at 32. An ADC hot gas torch running nitrogen at a back pressure of between 50 and 100 psig and a flow rate of between 50 and 100 SCFM produced an exit gas temperature typically of from 1100°–1400° F. (593°–760° C.), and 800°–900° F. (427°–482° C.) at the web surfaces. An HTT Moen unit using compressed air was also used. The nozzle type and size is dependent upon material composition and width, but typical nozzles had a distance to web/office size ratio between 2 and 8.

The uncorrugated material was fed onto the honeycomb top surface with the hot air jets on and the roller running at speeds of from 1 to 20 inches/sec (2.5 to 51 cm/sec) typically from 6 to 12 inches/sec (15 to 30 cm/sec) at a pressure on the node-antinode deme of between 50 to 300 psi, typically between 80 and 160 psi. Examples of measured consolidation speeds which have been achieved are 10 inches/sec (25.4 cm/sec) with 7781 woven glass fiber/polyphenylene sulfide; 6 inches/sec (15.2 cm/sec) with 112 woven glass/ polyethersulfone; and the Tyvek®, Typar and Reemay nonwovens at 15 ips (38.1 cm/sec). The width of the roller used in this example was 11.5 inches (29.2 cm).

When the roller and web reached the end of the row of formers, the gas flow was interrupted, the web cut with a razor knife, and the roller and uncorrugated web traversed to the starting position. At this position, the lowermost rods were withdrawn, raised by a distance greater than the thickness of the consolidated node-antinode surface, reinserted, and clamped down. The process of corrugation/ consolidation was then repeated until the desired honeycomb width was reached.

This process resulted in more uniform webs having more perfect cell shape. With some web materials, incomplete bonding of the node/antinode deme at the area furthest from the advancing toothed roller was noted. A change in nozzle design has alleviated this problem, for example by using the four toothed and five toothed consolidation rollers of FIGS. 8A and 8B with the modified gas impingement heater of FIG. 12. A second fusion step as depicted in FIG. 9 would also result in superior consolidation.

A 3.3 lb/ft$^3$, ¼" cell honeycomb made according to this example from 108 style woven glass oriented on a ±45° bias to the cell direction and impregnated with 35 percent by weight polyethersulfone was manufactured and tested yielding the following results:

| Flatwise Compression | 158 psi |
|---|---|
| Flexure | 350 lbs |
| Plate shear | 988 lbs |

These values compare favorably to values for thermoset honeycomb. However, the thermoplastic honeycomb requires only 1 minute to fabricate a cubic foot of honeycomb structure exclusive of top and bottom panels, while a similar thermoset honeycomb or adhesively bonded thermoplastic honeycomb requires typically greater than 24 hours to fabricate a similar size structure.

EXAMPLE 5–7

Induction bonding, ultrasonic bonding, as well as resistance heating of the fibers and ultrasonics were attempted. All of these attempts were successful in bonding the materials together but it was difficult to achieve adequate process speed and accuracy of heating.

Induction bonding experiments were conducted using the RF source from a home microwave oven (believed to be operating at 2.5 Ghz having up to 700 watts output) and a rectangular waveguide component with one end connected to the RF source and the other end potted with an RF transparent epoxy as the pressure surface/energy window. The level of power was varied as a function of resin type, web thickness and fiber type. Only lower melting resins were used such as polyethylene and nylon because of the temperature limitations of the epoxy window. Since the resins by themselves had little or no loss term associated with them, it was generally required to add a small amount of loss medium, such as carbon black or iron carbonyl powder, to the resin to enhance the susceptibility of the materials to the RF radiation. Glass reinforced systems were able to be bonded in less than two seconds/bond, however, the presence of carbon fibers in the resin usually precluded sufficient heating due to the high reflectivity of the fibers to the radiation.

Ultrasonics experiments in this area of technology utilized a 1000 watt Sonics and Materials industrial ultrasonic welding unit. These units work on the principle of converting an oscillating electrical signal into a mechanical one via a crystal convertor. The mechanical vibrations are then passed through a tuned horn of the appropriate shape. The fusion of the thermoplastic material occurs when the vibrating horn causes the two web surfaces to vibrate against one another and subsequently causes a frictional heat build up that is sufficient to melt the two materials together. Several horns were constructed (a 0.150" diameter face horn and a 4"×0.144" face horn) and used in the tests with amplifiers ranging from 1:1 to 1:2.5. Testing revealed that sufficient bond strength could be achieved in less than two seconds per node. Tests were performed on glass/PES, PPS and PEEK equivalents in both woven and non-woven styles. The non-reinforced resin webs bonded, on average, twice as fast as the reinforced versions. The glass reinforced systems were perhaps 25–50 percent faster than the graphite systems. The horn surface had to be in the absolutely correct position (parallel to the rod surface from one end to the other) in order to achieve uniform bonding over the entire node bond area. If this is not done, poor, irregular bonding will result. Because of the shape of the horn, this is not easily accomplished, and requires a self-aligning mounting device which will compensate for the inevitable web and rod irregularities. This difficulty then presents a potential difficulty for a multiple faced horn design because it will be difficult to guarantee a uniform web thickness or rod surface over a multiple node area. This is essentially the same problem faced by the solid platen approach described earlier which requires individual platen pressure elements to overcome. However, this fix will not work as well with ultrasonics since the horn must have intimate contact with both the booster mating surface as well as the material for optimal energy transfer to occur. Therefore, the only approach that appears to be feasible is to use a series of single faced horns which are each driven by their own convertors. However, like the multiple platen approach, it does require a rather high level of mechanical complexity to put into effect.

Resistance heating of the fibers themselves (carbon or graphite in this case), was attempted. An AC/DC welder was used to apply various amounts of both AC and DC currents through the carbon fibers in order to heat the surrounding fibers. Heat up times were quite rapid, but it was difficult to maintain a constant level of contact with the carbon fibers as the heating took place so that the degree of heating was difficult to control. Cycle times were less than two seconds per node but the amount of heating from node to node was quite erratic. An extension of this technique was also applied to a heating of the rod mandrels. Since the original steel rods would be difficult to heat up and cool down quickly without losing their dimensional stability, these metal rods were replaced with monolithic carbon rods supplied form Stackpole, Inc. A high current/low voltage energy source was connected to the rods as the top (already corrugated) web was applied in a rolling fashion. Because the rods had to heat to a sufficient temperature and then transfer that heat to both layers of material, the process is inherently slow, but it does work. A strip of copper conductor was used to apply the current to the rods in a sequential fashion as the top layer of web is applied. Bond times of approximately 10 seconds/node were achieved using this method. An alternative method of heating the rods was to insert small (⅛" diameter) cartridge heaters inside the carbon rods for the heat source. The drawback to this technique was the slow cycle time of the cartridge heat source. Bond times for this method average over 20 seconds/bond.

EXAMPLE 8

A honeycomb core was produced using spun-bonded TYVEK 1085D fabric as the primary core material. Following the production of several cell layers of honeycomb, the process was altered such that following corrugation and consolidation of one (primary) layer of TYVEK, one, two or three additional (secondary) layers of TYVEK having different dimensions along the thickness and length (x and y directions in the plane of the machine bed as illustrated in FIG. 1) were corrugated and consolidated onto the primary layer. A next primary layer of TYVEK, adding an additional half-cell height to the existing honeycomb was then corrugated/consolidated, and additional "secondary" layers of TYVEK added as before. After a number of iterations, the process was again altered to utilize but one layer of TYVEK. The resulting unitary honeycomb structure contained within it an area of much greater strength and modulus than the surrounding honeycomb, similar to that illustrated by FIG. 15.

I claim:

1. A unitary thermoplastic honeycomb structure having at least one area possessing different physical properties than the remainder of the honeycomb, wherein said at least one area possessing different physical properties comprises at least one half-cell height in which a primary thermoplastic web and at least one secondary thermoplastic web of the same or different material as each other are bonded together in a node to node and antinode to antinode relationship.

2. The unitary thermoplastic honeycomb of claim 1, wherein at least one secondary web has different characteristics than the primary web to which it is bonded.

3. The unitary thermoplastic honeycomb of claim 1, wherein at least one secondary web has different areal dimensions than the primary web to which it is bonded.

4. The unitary thermoplastic honeycomb of claim 1 wherein the at least one secondary thermoplastic web has different electromagnetic properties than that of the primary thermoplastic web.

5. A unitary thermoplastic honeycomb structure comprising a plurality of rows of a single corrugated thermoplastic web, each row defining a half-cell of the finished honeycomb, with the nodes of each half-cell bonded to the antinodes of the half-cells in the adjacent row, and at least one row formed from at least two thermoplastic webs.

6. The unitary thermoplastic honeycomb of claim 5, wherein said at least one row formed from at least two thermoplastic webs comprises at least two thermoplastic webs having different characteristics from each other.

7. The unitary thermoplastic honeycomb of claim 6 which comprises at least two adjacent rows of half-cells formed from at least two thermoplastic webs having different characteristics.

8. The unitary thermoplastic honeycomb of claim 5, wherein said at least one row formed from at least two thermoplastic webs comprises at least two thermoplastic webs having different areal dimensions from each other.

9. The unitary thermoplastic honeycomb structure of claim 5 wherein a plurality of rows are formed from at least two thermoplastic webs.

* * * * *